US012655276B2

(12) United States Patent
Shindo

(10) Patent No.: US 12,655,276 B2
(45) Date of Patent: Jun. 16, 2026

(54) RUBBER COMPOSITION FOR GOLF BALL, AND GOLF BALL

(71) Applicant: BRIDGESTONE SPORTS CO., LTD., Tokyo (JP)

(72) Inventor: Jun Shindo, Chichibushi (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 442 days.

(21) Appl. No.: 18/100,789

(22) Filed: Jan. 24, 2023

(65) Prior Publication Data

US 2023/0212374 A1 Jul. 6, 2023

Related U.S. Application Data

(63) Continuation-in-part of application No. 17/386,681, filed on Jul. 28, 2021, now abandoned, and a
(Continued)

(30) Foreign Application Priority Data

Jun. 11, 2018 (JP) ................................ 2018-111044

(51) Int. Cl.
*A63B 37/06* (2006.01)
*A63B 37/00* (2006.01)
(Continued)

(52) U.S. Cl.
CPC ............ *C08L 9/00* (2013.01); *A63B 37/0023* (2013.01); *A63B 37/0063* (2013.01); *C08F 4/44* (2013.01);
(Continued)

(58) Field of Classification Search
CPC ........................ A63B 37/0063; A63B 37/0065
See application file for complete search history.

(56) References Cited

U.S. PATENT DOCUMENTS 10,653,922 B2 5/2020 Watanabe et al.
10,695,618 B2 6/2020 Kimura et al.
(Continued)

FOREIGN PATENT DOCUMENTS

JP 2-80068 A 3/1990
JP 11-169485 A 12/2000
(Continued)

OTHER PUBLICATIONS

Communication issued Jan. 15, 2025 in Japanese Application No. 2021-082148.
(Continued)

*Primary Examiner* — Raeann Gorden
(74) *Attorney, Agent, or Firm* — Sughrue Mion, PLLC

(57) ABSTRACT

The present invention provides the rubber composition for a golf ball comprising (a) a base rubber, (b) a co-crosslinking agent which is an α,β-unsaturated carboxylic acid or a metal salt thereof or both, (c) a crosslinking initiator, and (d) an alcohol, wherein the amount of component (d) is from 0.1 to 10 parts by weight per 100 parts by weight of the base rubber (a) and the compounding ratio between component (b) and component (c) is set to at least 60 of E value that is represented by "E=the molar amount of component (b)/the molar amount of the active oxygen of component (c), and a golf ball using the rubber composition, in order to achieve the object that good durability of the golf ball to impact is maintained.

16 Claims, 2 Drawing Sheets

Related U.S. Application Data continuation-in-part of application No. 17/386,656, filed on Jul. 28, 2021, now abandoned, which is a continuation-in-part of application No. 16/406,099, filed on May 8, 2019, now Pat. No. 11,104,781.

(51) Int. Cl.

| | |
|---|---|
| ***C08F 4/44*** | (2006.01) |
| ***C08K 5/101*** | (2006.01) |
| ***C08K 5/14*** | (2006.01) |
| ***C08L 9/00*** | (2006.01) |
| ***C08L 23/12*** | (2006.01) |
| ***C08L 81/02*** | (2006.01) |

(52) U.S. Cl.

CPC ................ *C08K 5/101* (2013.01); *C08K 5/14* (2013.01); *C08L 23/12* (2013.01); *C08L 81/02* (2013.01)

(56) References Cited

U.S. PATENT DOCUMENTS

| | | | |
|---|---|---|---|
| 10,773,130 | B2 | 9/2020 | Watanabe et al. |
| 11,104,781 | B2 | 8/2021 | Shindo |
| 11,123,611 | B2 | 9/2021 | Shindo et al. |
| 2002/0137849 | A1 | 9/2002 | Kerns et al. |
| 2003/0208000 | A1 | 11/2003 | Higuchi et al. |
| 2006/0014898 | A1 | 1/2006 | Kim |
| 2006/0128900 | A1 | 6/2006 | Nanba et al. |
| 2006/0270492 | A1 | 11/2006 | Higuchi et al. |
| 2010/0298066 | A1 | 11/2010 | Kim |
| 2017/0368418 | A1 | 12/2017 | Nakajima et al. |
| 2018/0148548 | A1 | 5/2018 | Nakajima |
| 2019/0290971 | A1 | 9/2019 | Kimura et al. |
| 2019/0321688 | A1 | 10/2019 | Watanabe et al. |
| 2020/0001143 | A1* | 1/2020 | Shindo ............... A63B 37/0063 |
| 2020/0023240 | A1 | 1/2020 | Watanabe et al. |
| 2020/0306594 | A1 | 10/2020 | Kimura et al. |
| 2021/0106879 | A1 | 4/2021 | Watanabe et al. |
| 2021/0355300 | A1* | 11/2021 | Shindo ............. A63B 37/00621 |

FOREIGN PATENT DOCUMENTS

| | | | |
|---|---|---|---|
| JP | 2006-28517 | A | 2/2006 |
| JP | 2006-326301 | A | 12/2006 |
| JP | 2010-229586 | A | 10/2010 |
| JP | 2018-86175 | A | 6/2018 |
| JP | 2020-2233 | A | 1/2020 |
| JP | 2021-062036 | A | 4/2021 |

OTHER PUBLICATIONS

Office Action issued Mar. 22, 2022 in Japanese Application No. 2018-111044.

Communication dated Jan. 27, 2026, in Japanese Application No. 2022-119427.

Communication dated Jan. 27, 2026, in Japanese Application No. 2022-119449.

* cited by examiner

RUBBER COMPOSITION FOR GOLF BALL, AND GOLF BALL

CROSS-REFERENCE TO RELATED APPLICATION

This application is a continuation-in-part of copending two application Ser. No. 17/386,656 filed on Jul. 28, 2021 and Ser. No. 17/386,681 filed on Jul. 28, 2021, each of which is a continuation-in-part of application Ser. No. 16/406,099 filed on May 8, 2019 (now is U.S. Pat. No. 11,104,781), claiming priority based on Japanese Patent Application No. 2018-111044 filed in Japan on Jun. 11, 2018, the entire contents of which are hereby incorporated by reference.

TECHNICAL FIELD

The present invention relates to a rubber composition for golf balls, and to a golf ball in which the composition is used. More particularly, the invention relates to a rubber composition for golf balls which can be suitably used as the core material in golf balls having a core of one or more layer and a cover of one or more layer, and to a golf ball in which such a composition is used.

BACKGROUND ART

Golf balls lately are predominantly either two-piece solid golf balls or three-piece solid golf balls. These golf balls generally have a structure in which a cover of one layer or a plurality of layers made of various resin materials encases a core made of a rubber composition. The core accounts for most of the golf ball volume and exerts a large influence on ball properties such as rebound, feel and durability. Recently, a number of disclosures have been made in which the cross-sectional hardness of the core is suitably adjusted so as to achieve a specific core hardness gradient, thereby optimizing the spin properties of the ball on full shots with a driver or an iron and enabling the ball to travel an increased distance. Enlarging the hardness difference between the core surface and center is known have the effect of reducing the spin rate on full shots with a driver. Moreover, it is known from prior findings that reducing the spin rate on full shots leads to an increased distance. Accordingly, in order to improve the distance traveled by a golf ball, there is a desire for art that enlarges the hardness difference at the core interior. One approach that has been proposed for achieving this aim is to give the core a structure made of two rubber layers. However, producing such a core would entail a relatively large number of operations compared with a single-layer rubber core, and so there remains a desire for art that enlarges the hardness difference within a single-layer core.

Methods for adjusting the cross-sectional hardness of the core include, for example, suitably adjusting the compounding ingredients in the core rubber composition and the vulcanization temperature and time. Alternatively, with regard to the compounding ingredients in the core rubber composition, another method is to select the types of co crosslinking agent and organic peroxide used and to adjust their contents. In terms of co-crosslinking agents, the use of methacrylic acid, acrylic acid and metal salts thereof is known in the field of golf balls. However, adjustment in the compounding of such co crosslinking agents is intended primarily to modulate the feel of the ball on impact by regulating the core hardness, and is not capable of satisfying the desired spin properties.

JP-A H11-169485 discloses art in which a specific amount of polyethylene glycol is included in a core-forming rubber composition. However, the object of this prior art is to improve the mold releasability of a rubber molding (core) by including polyethylene glycol as an internal mold release agent. It is not aimed at further improving the internal hardness of a rubber molding and the spin-lowering effect on a golf ball by judicious selection of the types of compounding ingredients used in a core-forming rubber composition.

In addition, as to the golf ball using the core which enlarges the hardness difference at the core interior, the durability of the golf ball to impact is likely to decline. In particular, when undispersed foreign matter accidentally has been mixed in the manufacturing process of the core, it may raise that the core after vulcanizing and molding has early collapsed due to the foreign matter mixed into the core. In this case, even small amount of the foreign matter mixed into the rubber composition raised early collapse unexpectedly. Such the foreign matter often includes respective compounding ingredient used in the formulation process of the rubber composition for the core, for example, solid matter agglomerating the substances such as zinc oxide and zinc stearate, or its ground material.

Therefore, there was the limitation on the enlargement of hardness profile the core interia that is conducted to improve the flight performance, in order to concern that the durability of the golf ball to impact become inferior. Accordingly, it is desired that the low spin properties on golf ball shots are sufficiently achieved by enlarging the hardness profile of a core interia and early collapse of the core is prevented to obtain the core having excellent durability to impact.

SUMMARY OF THE INVENTION

It is therefore an object of the present invention to provide a rubber composition for golf balls which, by setting the hardness difference in the hardness profile of a golf ball core to a large value, is able to manifest low spin properties on golf ball shots and thus improve the flight performance of the ball, and is able to improve the durability of the ball to impact. A further object of the invention is to provide a golf ball made using this rubber composition.

As a result of extensive investigations, I have discovered that, by having a rubber composition for a golf ball core include as the essential compounding ingredients (a) a base rubber, (b) a co-crosslinking agent that is an $\alpha,\beta$-unsaturated carboxylic acid and/or a metal salt thereof, (c) a crosslinking initiator, (d) an alcohol, in which the compounding ratio (molar ratio) between component (b) and component (c) is set in larger value than that of the conventional techniques, specifically, E value, which is represented by "E=the molar amount of component (b)/the molar amount of the active oxygen of component (c)", be set to at least 60, the hardness difference in the hardness profile at the interior of the core can be set to a large value while maintaining a desired core hardness (deflection), enabling low spin properties to be fully manifested on golf ball shots, and the durability of golf ball to impact can be improved even when the foreign matter has mixed into the core. The reason for this, although not entirely clear, is thought to be as follows.

Normally, as to the influence of organic peroxides in a rubber composition comprising butadiene rubber (BR) and zinc acrylate (ZDA), in a radical reaction, BR-ZDA graft reaction preferentially occur than BR-BR crosslinking reaction. Thus, when the concentration of the organic peroxide is low, the rubber being the pattern of "high graft/low crosslinking" can be prepared selectively. Also, as to the grafted polymerization of BR-ZDA, ZDA nanoparticle (primary particle) having a several nanometer (nm) diameter, that differs from the particle diameter of ZDA monomer thrown into the polymerization process, is generated among butadiene (BR). Then, these ZDA nanoparticle agglomerate to become secondary particle having tens of nanometers diameter, and further the secondary particles are connected mutually such that network structure is formed. Such the phenomenon mentioned above is anticipated. For the above concern, it is anticipated that in the above rubber crosslinking structure of "high graft/low crosslinking", the rubber portion is extended due to low crosslinking in the time of a high elongation together with the reinforcement of the nanoparticle network grafted to BR, the result of which the high intensity of the rubber molding article can be brought about.

Accordingly, the present invention provides the following rubber composition for a golf ball and the golf ball.

1. A rubber composition for golf balls, comprising:
   (a) a base rubber,
   (b) a co-crosslinking agent which is an α,β-unsaturated carboxylic acid or a metal salt thereof or both,
   (c) a crosslinking initiator, and
   (d) an alcohol,
   wherein the amount of component (d) is from 0.1 to 10 parts by weight per 100 parts by weight of the base rubber (a) and the compounding ratio between component (b) and component (c) is set to at least 60 of E value that is represented by "E=the molar amount of component (b)/the molar amount of the active oxygen of component (c)".
2. The rubber composition of the above 1, wherein component (d) is a lower alcohol having a molecular weight of less than 200.
3. The rubber composition of the above 1, wherein component (d) is butanol, glycerol, ethylene glycol, diethylene glycol, triethylene glycol, propylene glycol, dipropylene glycol, or tripropylene glycol.
4. The rubber composition of the above 1, wherein component (d) has a value obtained by dividing the molecular weight by the number of hydroxyl groups (valence) that is 100 or less.
5. The rubber composition of the above 1, wherein the amount of component (d) is from 0.1 to 5 parts by weight per 100 parts by weight of the base rubber (a).
6. The rubber composition of the above 1, wherein the E value is at least 70.
7. The rubber composition of the above 1, wherein component (a) is polybutadiene synthesized with a rare-earth catalyst.
8. The rubber composition of the above 1, further comprising sulfur or an organosulfur compound serving as component (e).
9. The rubber composition of the above 8, wherein the component (e) is the organosulfur compound selected among thiols and alkylphenoldisulfide polymers.
10. The rubber composition of the above 1, wherein, further as component (f), hinderedphenol or benzoimidazole of the following general formula (1) and/or a metal salt is included.

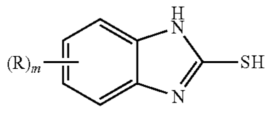

(1)

[In formula (1), R is a hydrogen atom or a hydrocarbon group of 1 to 20 carbon atoms and m is an integer from 1 to 4, with each R being the same or different when m is 2 or more.]

11. A golf ball comprising a core and a cover of one or more layers encasing the core, wherein the core is formed of the rubber composition of the above 1 and the core has a hardness profile in which a surface and a center of the core have a hardness difference therebetween of at least 16 on the JIS-C hardness scale.
12. The golf ball of the above 11, wherein the core has an amount of deflection of not more than 3.2 mm when compressed under a final load of 1,275 N (130 kgf) from an initial load of 98 N (10 kgf).

Advantageous Effects of the Invention

According to the rubber composition for golf balls of the present invention, a specific rubber crosslinking structure of "high graft/low crosslinking" can be obtained, and then, when the rubber member having this rubber crosslinking structure is applied to to various structural elements of a golf ball, especially the core, the present invention is able to manifest low spin properties in the golf ball when the ball is hit and can therefore improve the flight performance of the ball, and also the present invention can improve durability the ball to impact even when the foreign matter has been mixed in the core.

BRIEF DESCRIPTION OF THE DIAGRAMS

DESCRIPTION OF THE PREFERRED EMBODIMENTS

Figure 1:
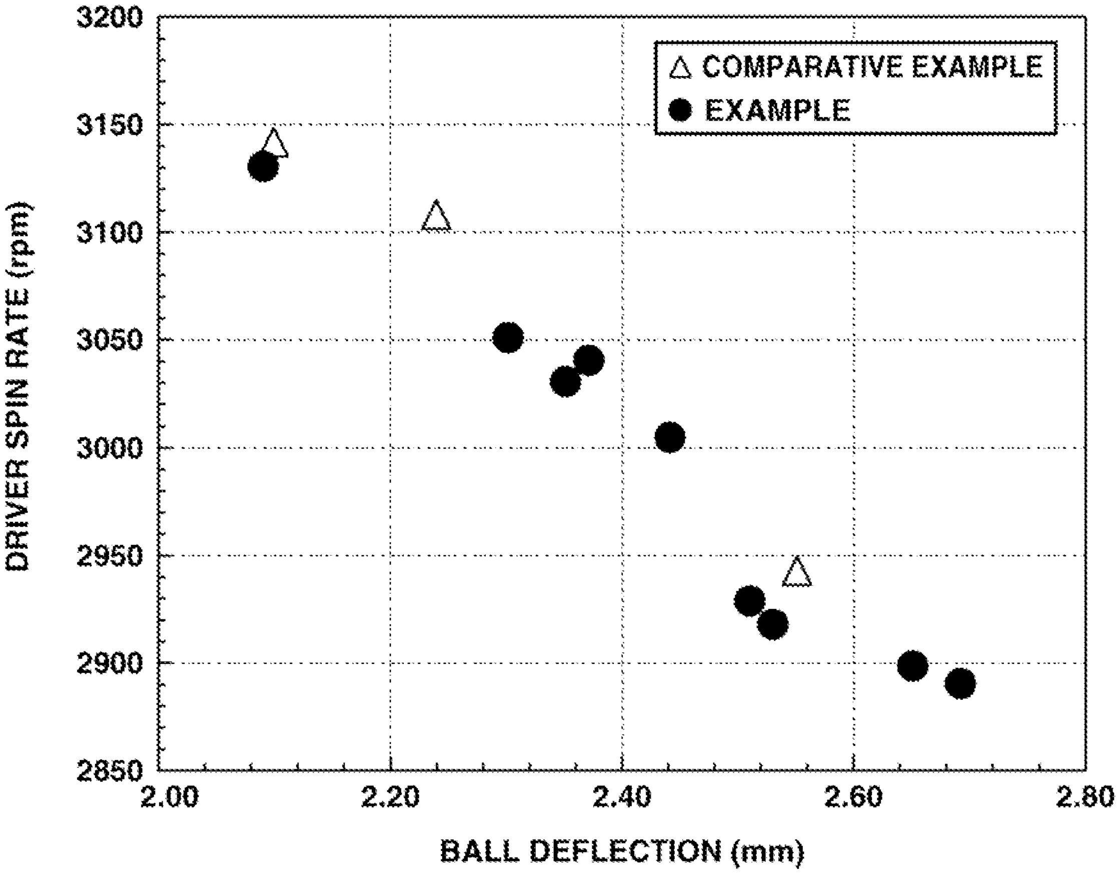
FIG. 1 is a graph for illustrating the relationships between the golf ball deflection and spin rate hitting with a driver (W #1) in each of Examples and Comparative Examples.

The objects, features and advantages of the invention will become more apparent from the following detailed description.

The rubber composition for golf balls of the invention is characterized by including the following components:

(a) a base rubber,
(b) a co-crosslinking agent which is an α,β-unsaturated carboxylic acid and/or a metal salt thereof,
(c) a crosslinking initiator, and
(d) an alcohol.

The base rubber serving as component (a) is not particularly limited, although it is especially suitable to use polybutadiene.

It is desirable for the polybutadiene to have, in the polymer chain thereof, a cis-1,4 bond content of at least 60%, preferably at least 80%, more preferably at least 90%, and most preferably at least 95%. When cis-1,4 bonds account for too few of the bonds on the polybutadiene molecule, the resilience may decrease.

The content of 1,2-vinyl bonds on the polybutadiene is generally 2% or less, preferably 1.7% or less, and more preferably 1.5% or less, of the polymer chain. When the content of 1,2-vinyl bonds is too high, the resilience may decrease.

The polybutadiene has a Mooney viscosity (ML1+4 (100° C.)) of preferably at least 20, and more preferably at least 30.

The upper limit is preferably not more than 120, more preferably not more than 100, and even more preferably not more than 80.

The term "Mooney viscosity" used herein refers to an industrial indicator of viscosity (JIS K 6300) measured with a Mooney viscometer, which is a type of rotary plastometer. This value is represented by the unit symbol ML1+4 (100° C.), wherein "M" stands for Mooney viscosity, "L" stands for large rotor (L-type) and "1+4" stands for a pre-heating time of 1 minute and a rotor rotation time of 4 minutes. The "100° C." indicates that measurement was carried out at a temperature of 100° C.

The polybutadiene used may be one synthesized with a rare-earth catalyst or a group VIII metal compound catalyst.

A polybutadiene rubber synthesized with a catalyst differing from the above lanthanum rare-earth compound may be included in the base rubber. In addition, styrene butadiene rubber (SBR), natural rubber, polyisoprene rubber, ethylene propylene diene rubber (EPDM) or the like may also be included. These may be used singly or two or more may be used in combination.

The polybutadiene accounts for a proportion of the overall rubber that is preferably at least 60 wt %, more preferably at least 70 wt %, and most preferably at least 90 wt %. The above polybutadiene may account for 100 wt % of the base rubber; that is, it may account for all of the base rubber.

Next, component (b) is a co-crosslinking agent, this being an α,β-unsaturated carboxylic acid and/or a metal salt thereof. The number of carbon atoms on this unsaturated carboxylic acid is preferably from 3 to 8. Specific examples include unsaturated carboxylic acids such as acrylic acid, methacrylic acid, maleic acid and fumaric acid. Specific examples of the metal in the metal salts of these unsaturated carboxylic acids include zinc, sodium, magnesium, calcium and aluminum, with zinc being especially preferred. The co-crosslinking agent is most preferably zinc acrylate.

Component (c) is a crosslinking initiator. It is preferable to use an organic peroxide as this crosslinking initiator, and especially preferable to use an organic peroxide having a one minute half-life temperature of between 110 and 185° C. Examples of such organic peroxides include dicumyl peroxide (Percumyl D, from NOF Corporation), 2,5-dimethyl-2,5-di(t-butylperoxy)hexane (Perhexa 25B, from NOF Corporation) and di-(2-t-butylperoxyisopropyl)benzene (Perbutyl P, from NOF Corporation). The use of dicumyl peroxide is preferred. Other commercial products include Perhexa C-40, Niper BW and Peroyl L (all from NOF Corporation), and Luperco 231XL (from AtoChem Co.). These may be used singly, or two or more may be used together.

In the present invention, with respect to the amounts of component (b) and component (c) described above, the respective amount is adjusted so as to be that the compounding ratio between component (b) and component (c) is at least 60 of E value that is represented by "E=the molar amount of component (b)/the molar amount of the active oxygen of component (c) on order to realize the rubber crosslinking structure specified by high graft and low crosslinking configuration. Specifically, the content of co-crosslinking agent being component (b) per 100 parts by weight of the base rubber is preferably from 30 to 60 parts by weights and the content of organic peroxide being component (c) per 100 parts by weight of the base rubber is preferably from 0.05 to 0.80 parts by weights, and the E value is preferably set within the above range. The E value is preferably at least 70, more preferably at least 80, and even more preferably at least 90. Too extremely higher content of the co-crosslinking agent or too extremely lower content of an organic peroxide may not obtain the desired crosslinking structure and may not manifest low spin properties by enlarging the hardness profile of the core interia. Therefore, the upper limit of the E value is preferably not more than 1400 and more preferably not more than 1000.

The molar amounts of component (b) and component (c) used in the calculation of the above E value means the molar amounts given from the actual weight of each of the co-crosslinking agent of component (b) and component (c). And, the molar amount of the active oxygen of component (c) means the molar weight multiplying the number of the peroxide bond (—O—O-bond) by the molar amount of organic peroxide of component (c). The number of the peroxide bond (—O—O-bond) is normally same meaning as "the number of peroxide bond" in the formula of the amount of theoretical active oxygen represented by the following formula. Namely, the theoretical amount of the active oxygen of 100% purity organic peroxides is indicated in respective organic peroxide by the percentage that the active oxygen is divided by the molecular weight of the organic peroxide, which indicates a guideline for representing the amount of free radical and concentration or purity of the products thereof.

Amount of theoretical active oxygen (%)=Number of peroxide bond×16/Molecular weight Next, component (d) is an alcohol. By including an alcohol as serving component (d) in the rubber composition, a cured rubber material (core) having the desired core hardness profile can be obtained during vulcanization (curing) of the rubber composition, as a result of which the ball fully achieves a lower spin rate when hit, enabling the ball to be endowed with an excellent flight performance. As used herein, an "alcohol" refers to a substance having at least one alcoholic hydroxyl group; substances obtained by polycondensing polyhydric alcohols having two or more hydroxyl groups are also included herein as alcohols.

It is especially preferable for the alcohol to be a hexahydric or lower alcohol (an alcohol having up to six alcoholic hydroxyl groups). Specific, examples include, but are not limited to, methanol, ethanol, propanol, butanol, ethylene glycol, diethylene glycol, propylene glycol, dipropylene glycol, tripropylene glycol, glycerol, butanetriol, trimethylolethane, trimethylolpropane, di(trimethylolpropane), pentaerythritol and sorbitol. These have molecular weights which, although not particularly limited, are preferably below 300, more preferably below 250, and even more preferably below 200. When the molecular weight is too large, i.e., when the number of carbons is too high, the desired core hardness profile may not be obtained or a reduced ball spin rate on impact may not be fully achieved. The component (d) is not particularly limited, although it is preferably to use an alcohol which is defined as a substance having a value obtained by dividing the molecular weight by the number of hydroxyl groups thereon which is 100 or less, more preferably 70 or less, even more preferably 50 or less. When this numerical value is too large, the sufficient flight performance may not be obtained.

The content of component (d) per 100 parts by weight of the base rubber is preferably at least 0.1 part by weight, and more preferably at least 0.5 part by weight. The upper limit is preferably not more than 10 parts by weight, more preferably not more than 6 parts by weight, and even more preferably not more than 3 parts by weight. At a component (d) content that is too high, the hardness decreases and the desired feel at impact, durability and rebound may not be obtained. At a content that is too low, the desired core hardness profile may not be obtained and a reduced spin rate may not be fully achieved when the ball is hit.

Further, sulfur or organosulfur may be included as component (e) in the invention.

As to sulfur, commercial products may be used and include "SULFAX 5" from Turumi Chemical Industry Co., Ltd., "SANMIX IS-60N", "SANMIX S-80N" from Sansin Chemical Industry Co., Ltd., "AKROFORM S-80/EPR/P" from Akrochem Corporation and the like.

The content of sulfur per 100 parts by weight of the base rubber is, not particularly limited, preferably at least 0.01 part by weight, more preferably at least 0.03 part by weight, most preferably at least 0.05 part by weight. The upper limit is preferably not more than 5.0 parts by weight, more preferably not more than 2.0 parts by weight, most preferably not more than 1.0 parts by weight. At a sulfur content that is too high, the crosslinking reaction with peroxide is prevented by the influence of sulfur such that the entire hardness of the molded article largely soften. At a sulfur content that is too low, the hardness difference in the hardness profile at the interior of the core may not be set to a large value.

It is preferable that sulfur is used in the form of a masterbatch in order to enhance the dispersibility of a small amount of sulfur. The illustrative Examples of such the sulfur includes the above trade names of "SANMIX IS-60N", "SANMIX S-80N" and "AKROFORM S-80/EPR/P", each of which is a sulfur masterbatch.

The organosulfur compound serving as component (e) is not particularly limited. Examples include thiophenols, thionaphthols, diphenylpolysulfides, halogenated thiophenols, and metal salts of these. Specific examples include the zinc salts of pentachlorothiophenol, pentafluorothiophenol, pentabromothiophenol and p-chlorothiophenol, and any of the following having 2 to 4 sulfur atoms: diphenylpolysulfides, dibenzylpolysulfides, dibenzoylpolysulfides, dibenzothiazoylpolysulfides and dithiobenzoylpolysulfides. These may be used singly, or two or more may be used together. Of these, preferred use can be made of the zinc salt of pentachlorothiophenol and/or diphenyldisulfide.

It is recommended that the amount of organosulfur compound included per 100 parts by weight of the base rubber be preferably at least 0.05 part by weight, more preferably at least 0.1 part by weight, and even more preferably at least 0.2 part by weight, and that the upper limit be preferably not more than 3 parts by weight, more preferably not more than 2 parts by weight, and even more preferably not more than 1 part by weight. Including too much organosulfur compound may result in a hot-molded rubber composition that has too low a hardness. On the other hand, including too little may make a rebound-improving effect unlikely.

Component (e) may be an organosulfur that is alkylphenoldisulfide polymers represented by the following chemical formula:

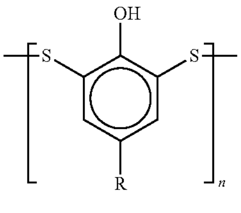

In the above chemical formula (2), R is an alkyl group and n is degree of polymerization in a range of 2 to 20. The alkyl group of R in the chemical formula is preferably an lower alkyl group of 1 to 6 carbon atoms which include methyl, ethyl, n-propyl, iso-propyl, n-butyl, tert-butyl, n-amyl (pentyl), iso-amyl (pentyl), tert-amyl (pentyl), sec-isoamyl, neopentyl, n-hexyl, iso-hexyl, tert-hexyl groups. More preferably, the organosulfur is amylphenoldisulfide polymers. Commercial products that may be used include "Sanceler AP" from Sanshin Chemical Industry Co., Ltd., "Vultac 5" from Arkema S.A. and the like.

The content of alkylphenoldisulfide polymers per 100 parts by weight of the base rubber is preferably at least 0.05 part by weight, more preferably at least 0.1 part by weight, most preferably at least 0.3 part by weight. The upper limit is preferably not more than 5.0 parts by weight, more preferably not more than 3.0 parts by weight, most preferably not more than 2.0 parts by weight. At its content that is too high, the crosslinking reaction with peroxide is prevented by the influence of sulfur such that the entire hardness of the molded article largely soften.

Further, an antioxidant may be included as component (f) in the invention. Examples of antioxidants include hindered phenol-type antioxidants such as 2,6-di-tert-butyl-4-methylphenol, 2,6-di-tert-butyl-4-ethylphenol, 2,2-methylenebis(4-methyl-6-tert-butylphenol), pentaerythritol tetrakis[3-(3,5-di-tert-butyl-4-hydroxyphenyl)propionate] and 1,3,5-tris(3',5'-di-t-butyl-4-hydroxybenzyl)isocyanuric acid. Commercial products that can be used include Nocrac 200, Nocrac M-17 (both from Ouchi Shinko Chemical Industry Co., Ltd.), Irganox 1010 (from BASF) and ADK Stab AO-20 (from Adeka). These may be used singly, or two or more may be used together. The amount of this antioxidant included per 100 parts by weight of the base rubber, although not particularly limited, is preferably at least 0.05 part by weight, and more preferably at least 0.1 part by weight. The upper limit is preferably not more than 3.0 parts by weight, more preferably not more than 2.0 parts by weight, and even more preferably not more than 1.5 parts by weight. When too much or too little is included, a proper core hardness gradient may not be obtained, as a result of which it may not be possible to achieve a good rebound, a good durability and a good spin rate-lowering effect on full shots.

Also, a benzoimidazole of the following general formula (1) and/or a metal salt thereof is used as (f) an antioxidant.

(1)

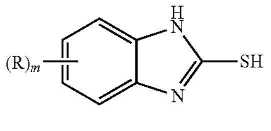

In formula (1), R is a hydrogen atom or a hydrocarbon group of 1 to 20 carbon atoms and m is an integer from 1 to 4, with each R being the same or different when m is 2 or more. Specific examples of the benzoimidazole of formula (1) include 2-mercaptobenzoimidazole, 2-mercaptomethylbenzoimidazole, and metal salts of these. The metal salts are preferably zinc salts.

Aside from above components (a) to (f), various additives such as fillers and processing aids may be included, provided that doing so is not detrimental to the objects of the invention.

Examples of fillers that may be suitably used include zinc oxide, barium sulfate and calcium carbonate. These may be used singly, or two or more may be used together. The filler content per 100 parts by weight of the base rubber may be set to preferably at least 1 part by weight, more preferably at least 3 parts by weight, and even more preferably at least 5 parts by weight. The upper limit in the filler content per 100 parts by weight of the base rubber may be set to preferably not more than 100 parts by weight, more preferably not more than 60 parts by weight, and even more preferably not more than 40 parts by weight. At a filler content that is too high or too low, it may not be possible to obtain a proper weight and a suitable rebound.

Processing aids that may be suitably used include higher fatty acids and metal salts thereof. Examples of higher fatty acids include stearic acid, palmitic acid, oleic acid, linoleic acid, linolenic acid and myristic acid. Stearic acid is especially preferred. Examples of higher fatty acid metal salts include lithium salts, sodium salts, potassium salts, copper salts, magnesium salts, calcium salts, strontium salts, barium salts, tin salts, cobalt salts, nickel salts, zinc salts and aluminum salts. The use of zinc stearate is especially preferred. The amount of processing aid included per 100 parts by weight of the base rubber may be set to preferably at least 1 part by weight, more preferably at least 3 parts by weight, and even more preferably at least 5 parts by weight. The upper limit in this amount of addition per 100 parts by weight of the base rubber may be set to preferably not more than 20 parts by weight, more preferably not more than 15 parts by weight, and even more preferably not more than 10 parts by weight. When too much is added, a sufficient hardness and rebound may not be obtained; when too little is added, the chemicals that are added may not fully disperse and it may not be possible to obtain the expected properties. Examples of methods that may be used to add the processing aid include, but are not particularly limited to: charging the processing aid into a mixer at the same time as other chemicals, adding the processing aid after first mixing it together with other chemicals such as component (b), adding the processing aid after coating it onto the surface of other chemicals such as component (b), and adding the processing aid after first preparing a masterbatch of it together with component (a).

A vulcanizate can be produced by vulcanizing/curing the rubber composition for golf balls of the invention. For example, a core which is a vulcanizate can be produced by using a mixing apparatus such as a Banbury mixer or a roll mill to knead the rubber composition, then using a core mold to compression mold or injection mold the kneaded composition and suitably heating the molded body at a temperature suitable for the organic peroxide and co-crosslinking agent to act, such as at between about 100° C. and about 200° C. for a period of 10 to 40 minutes, so as to cure the molded body.

Here, by compounding the ingredients as described above, the vulcanized/cured rubber molding for a golf ball can be conferred with a hardness gradient in which the difference in hardness between the surface and the center thereof is large. By employing this rubber molding for a golf ball as a golf ball core, the durability of the golf ball can be increased while maintaining the good spin properties of the ball.

The core has a center hardness on the JIS-C hardness scale which, although not particularly limited, is preferably at least 40, more preferably at least 45, and even more preferably at least 50. The upper limit is preferably not more than 75, more preferably not more than 70, and even more preferably not more than 65. At a core center hardness outside of this range, the feel on impact may be poor, the durability may decline and it may not be possible to obtain a spin rate-lowering effect.

The core has a surface hardness on the JIS-C hardness scale which, although not particularly limited, is preferably at least 65, more preferably at least 70, and even more preferably at least 72. The upper limit is preferably not more than 95, more preferably not more than 90, and even more preferably not more than 88. When the surface hardness of the core is lower than this range, the ball rebound may decrease, as a result of which a sufficient distance may not be achieved. On the other hand, when the surface hardness of the core is higher than the above range, the feel at impact may be too hard and the durability to cracking on repeated impact may worsen.

The core has a hardness profile such that the hardness difference between the surface and center of the core is sufficiently large. Specifically, the difference in hardness on the JIS-C scale between the surface A and center B of the core, expressed as A-B, is preferably at least 16, more preferably at least 19, and even more preferably at least 20. The upper limit is preferably not more than 50, more preferably not more than 45, and even more preferably not more than 40. When this hardness difference value is too small, the spin rate-lowering effect on shots with a W #1 may be inadequate and a good distance may not be achieved. On the other hand, when this hardness difference is too large, the initial velocity of the ball when struck may become lower, resulting in a shorter distance, or the durability of the ball to cracking on repeated impact may worsen. Here, "center hardness" refers to the hardness measured at the center of the cross-section obtained by cutting the core through the center, and "surface hardness" refers to the hardness measured at the spherical surface of the core. "JIS-C hardness" refers to the hardness measured with a spring-type durometer (JIS-C model) as specified in JIS K 6301-1975.

The core hardness gradient used in this invention is preferably one in which the hardness remains the same or increases, but does not decrease, from the center toward the surface of the core.

It is recommended that the core (vulcanizate) have a compression hardness (deformation) when compressed under a final load of 1,275 N (130 kgf) from an initial load of 98 N (10 kgf) which, although not particularly limited, is preferably not more than 3.2 mm, and more preferably not more than 3.0 mm. The lower limit is not particularly limited, but, is preferably at least 2.0 mm, more preferably at least 2.3 mm, and even more preferably at least 2.5 mm. When this value is too large, the core becomes too soft, as a result of which the resilience may decrease. When this value is too small, a spin rate-lowering effect may not be obtained and the feel of the ball on impact may become hard.

The core diameter, which is not particularly limited and depends also on the layer construction of the golf ball to be produced, is preferably at least 30 mm, and more preferably at least 35 mm, but is preferably not more than 41 mm, and more preferably not more than 40 mm. At a core diameter outside of this range, the initial velocity of the ball may become low or suitable spin properties may not be obtained.

As described above, the foregoing rubber composition is suitably used as a golf ball core. The golf ball of the invention preferably has a structure that includes a core and a cover of one or more layers.

Next, the cover of one or more layers encasing the core is described.

The cover material is not particularly limited, although known materials such as to various types of ionomeric resins and thermoplastic polyurethane elastomers used in golf balls may be employed.

To realize an even further spin rate-lowering effect in the ball, it is especially preferable to use a highly neutralized ionomeric material in the layer adjoining the core. Specifically, it is preferable to use a material obtained by blending components (i) to (iv) below:

100 parts by weight of a resin component composed of, in admixture, (i) a base resin of (i-1) an olefin-unsaturated carboxylic acid random copolymer and/or a metal ion neutralization product of an olefin-unsaturated carboxylic acid random copolymer mixed with (i-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (ii) a non-ionomeric thermoplastic elastomer in a weight ratio between 100:0 and 50:50;

(iii) from 5 to 80 parts by weight of a fatty acid and/or fatty acid derivative having a molecular weight of from 228 to 1,500; and (iv) from 0.1 to 17 parts by weight of a basic inorganic metal compound capable of neutralizing un-neutralized acid groups in components (i) and (iii).

In particular, when using a mixed material of components (i) to (iv), it is preferable to utilize one in which at least 70% of the acid groups are neutralized.

The material making up the outermost layer of the cover is preferably one composed primarily of a urethane material, especially a thermoplastic urethane elastomer.

One or more cover layer (intermediate layer) may be formed between the layer adjoining the core and the outermost cover layer. In this case, it is preferable to use a thermoplastic resin such as an ionomer as the intermediate layer material.

To obtain the cover in this invention, use may be made of, for example, a method that involves placing within a mold a single-layer core or a multilayer core of two or more layers that has been prefabricated according to the type of ball, mixing and melting the above mixture under applied heat, and injection-molding the molten mixture over the core so as to encase the core with the desired cover. The cover producing operations in this case can be carried out in a state where excellent thermal stability, flowability and processability are assured. As a result, the golf ball ultimately obtained has a high rebound, and moreover has a good feel on impact and excellent scuff resistance. Alternatively, use may be made of a cover-forming method other than the foregoing, such as one in which, for example, a pair of hemispherical half-cups are molded beforehand from the cover material described above, following which the core is enclosed within the half-cups and molding is carried out under applied pressure at between 120° C. and 170° C. for a period of 1 to 5 minutes.

When the cover has only one layer, the thickness of that layer may be set to from 0.3 to 3 mm. When the cover has two layers, the thickness of the outer cover layer may be set to from 0.3 to 2.0 mm and the thickness of the inner cover layer (intermediate layer) may be set to from 0.3 to 2.0 mm. The Shore D hardnesses of the respective layers making up the cover (cover layers), although not particularly limited, are set to preferably at least 40, and more preferably at least 45. The upper limit is preferably not more than 70, and more preferably not more than 65.

Numerous dimples are formed on the surface of the outermost layer of the cover. In addition, the cover may be subjected to various types of treatment, such as surface preparation, stamping and painting. In cases where such surface treatment is imparted to the cover formed of the above cover material, the good moldability of the cover surface enables the work to be carried out efficiently.

The invention provides a golf ball in which the above rubber composition is used as the core material for at least one core layer. With regard to the type of golf ball, this rubber composition may be used without particular limitation in golf balls having a core and one or more cover layer, including solid golf balls such as two-piece or three-piece solid golf balls in which the solid core is encased by the cover and multi-piece golf balls having at least a three-piece construction, and also wound golf balls in which a wound core is encased by a single-layer cover or a cover with a multilayer construction of two or more layers.

EXAMPLES

Examples of the invention and Comparative Examples are given below by way of illustration, although the invention is not limited by the following Examples.

Examples 1 to 9, Comparative Examples 1 to 3

Cores having a diameter of about 38.6 mm are produced by using the core materials composed primarily of polybutadiene shown in Table 1 below to prepare core compositions formulated for Working Examples 1 to 9 and Comparative Examples 1 to 3, subsequently vulcanizing the compositions at 158° C. for 20 minutes, and then abrading the core surface.

TABLE 1

| Rubber formulation | | Working Example | | | | | |
|---|---|---|---|---|---|---|---|
| | (pbw) | 1 | 2 | 3 | 4 | 5 | 6 |
| (a) | Polybutadiene rubber | 100 | 100 | 100 | 100 | 100 | 100 |
| (b) | Zinc acrylate | 38.5 | 42.5 | 41.5 | 41.5 | 47.5 | 43.0 |
| (c-1) | Organic peroxide (1) | 0.5 | 0.5 | 0.3 | 0.3 | 0.3 | 0.2 |
| (c-2) | Organic peroxide (2) | | | 0.1 | | | 0.1 |
| (d) | Propylene glycol | 0.6 | | 1.2 | 0.6 | 1.2 | 1.2 |
| (d) | Glycerol | | 1.2 | | | | |
| — | Zinc oxide | 14.5 | 12.9 | 13.1 | 13.2 | 10.8 | 12.4 |
| (e) | Organosulfur (1) | 0.3 | 0.3 | 0.6 | 0.3 | 0.3 | 0.6 |

TABLE 1-continued

| | | | | | | | |
|---|---|---|---|---|---|---|---|
| (e) | Organosulfur (2) | | | | | | |
| (f) | Antioxidant (1) | 0.1 | 0.1 | 0.1 | 0.1 | 0.1 | 0.1 |
| (f) | Antioxidant (2) | | | | | | |
| — | Artificial foreign matter * | 1 | 1 | 1 | 1 | 1 | 1 |
| | Substantive weight of component (b) | 32.7 | 36.1 | 35.3 | 35.3 | 40.4 | 36.6 |
| | Molar amount of component (b) | 0.158 | 0.174 | 0.170 | 0.170 | 0.195 | 0.176 |
| | Molar amount of component (c-1) | 0.00185 | 0.00185 | 0.00111 | 0.00111 | 0.00111 | 0.00074 |
| | Molar amount of component (c-2) | | 0 | 0.00015 | 0 | 0 | 0.00015 |
| | Molar amount of component (c) in total | 0.00185 | 0.00185 | 0.00126 | 0.00111 | 0.00111 | 0.00089 |
| | Active oxygen amount of component (c) | 0.00185 | 0.00185 | 0.00142 | 0.00111 | 0.00111 | 0.00105 |
| | Molar amount of component (b)/ Molar amount of active oxygen amount of component (c) | 85.4 | 94.1 | 120.6 | 153.2 | 175.7 | 169.2 |

| Rubber formulation | | Working Example | | | Comparative Example | | |
|---|---|---|---|---|---|---|---|
| (pbw) | | 7 | 8 | 9 | 1 | 2 | 3 |
| (a) | Polybutadiene rubber | 100 | 100 | 100 | 100 | 100 | 100 |
| (b) | Zinc acrylate | 51.5 | 40.0 | 48.0 | 37.0 | 43.0 | 46.5 |
| (c-1) | Organic peroxide (1) | 0.1 | 0.3 | 0.3 | 1.0 | 1.0 | 1.0 |
| (c-2) | Organic peroxide (2) | | 0.5 | 0.5 | | | |
| (d) | Propylene glycol | 1.2 | 0.9 | 0.9 | 0.6 | 0.6 | 0.6 |
| (d) | Glycerol | | | | | | |
| — | Zinc oxide | 8.9 | 12.9 | 9.5 | 15.5 | 13.0 | 11.5 |
| (e) | Organosulfur (1) | 0.6 | 1.0 | 1.0 | 0.4 | 0.4 | 0.4 |
| (e) | Organosulfur (2) | | 1.0 | 1.0 | | | |
| (f) | Antioxidant (1) | 0.1 | 0.1 | 0.1 | 0.1 | 0.1 | 0.1 |
| (f) | Antioxidant (2) | | 0.3 | 0.3 | | | |
| — | Artificial foreign matter * | 1 | 1 | 1 | 1 | 1 | 1 |
| | Substantive weight of component (b) | 43.8 | 34.0 | 40.8 | 31.5 | 36.6 | 39.5 |
| | Molar amount of component (b) | 0.211 | 0.164 | 0.197 | 0.152 | 0.176 | 0.190 |
| | Molar amount of component (c-1) | 0.00037 | 0.00111 | 0.00111 | 0.00370 | 0.00370 | 0.00370 |
| | Molar amount of component (c-2) | 0 | 0.00077 | 0.00077 | 0 | 0 | 0 |
| | Molar amount of component (c) in total | 0.00037 | 0.00188 | 0.00188 | 0.00370 | 0.00370 | 0.00370 |
| | Active oxygen amount of component (c) | 0.00037 | 0.00265 | 0.00265 | 0.00370 | 0.00370 | 0.00370 |
| | Molar amount of component (b)/ Molar amount of active oxygen amount of component (c) | 570.3 | 61.9 | 74.3 | 41.1 | 47.6 | 51.4 |

Details on the above formulations are given below.

Polybutadiene: Available under the trade name “BR 700” from ENEOS Corporation, high-cis-polybutadine rubber, Nd catalyst polymerization Zinc acrylate: Available under the trade name “ZN-DA85S” (85% zinc acrylate/15% zinc stearate) from Nippon Shokubai Co., Ltd.

Organic Peroxide (1): Dicumyl peroxide, available under the trade name “Percumyl D” from NOF Corporation, purity 100%

Organic Peroxide (2): Mixture of 1,1-di(tert-butylperoxy) cyclohexane and silica, available under the trade name “Perhexa C-40” from NOF Corporation, purity 40%

Propylene glycol: molecular weight, 76.1 (from Hayashi Pure Chemical Ind., Inc.)

Glycerol: molecular weight, 92.1 (from Hayashi Pure Chemical Ind., Inc.)

Zinc oxide: Available as “Zinc Oxide Grade 3” from Sakai Chemical Co, Ltd.

Organosulfur (1): Zinc salt of pentachlorothiophenol: Available from FUJIFILM Wako Pure Chemical Corporation Organosulfur (2): Amylphenoldisulfide polymers: Available the trade name “Sanceler AP” from Sanshin Chemical Industry Co., Ltd.

Antioxidant (1): A hindered phenolic antioxidant available under the trade name “Nocrac NS-6” from Ouchi Shinko Chemical Industry Co., Ltd.

Antioxidant (2): A benzimidazole antioxidant available under the trade name "Nocrac MB" from Ouchi Shinko Chemical Industry Co., Ltd.

Calculating Method for Molar Amount of Component (b)/Molar Amount of Active Oxygen of Component (c)

All of examples uses the trade name "ZN-DA85S" from Nippon Shokubai Co., Ltd. as zinc acrylate of component (b). The trade name is the blend product of 85% zinc acrylate and 15% zinc stearate. For example, in Example 2, the substantial amount of component (b) is "42.5×0.85=36.125". Since the molecular weight of zinc acrylate is "207.5", the molar amount of component (b) is "36.125/207.5≅0.174". Since the molecular weight of dicumyl peroxide being an organic peroxode of component (c-1) is 270.38 and its purity is 100%, the molar weight of component (c-1) is "0.5/270.38≅0.00185". Since the bond number of the active oxygen of (c-1) an organic peroxide is one, the molar weight of the active oxygen is same as the molar weight of the organic peroxide. Thus, E value of Example 2, being represented by "E=the molar amount of component (b)/the molar amount of the active oxygen of component (c), is "0.174/0.00185≅94.1".

As to Example 3, by the same calculating method as described above, the molar weight of component (b) is "(41.5×0.85)/207.5≅0.170". and the molar weight of component (c-1) is "0.3/270.38≅0.00111". Example 3 uses component (c-2) as an organic peroxide together with the component (c-1) and the purity of the trade name "Perhexa C-40" is 40%. Also, the molecular weight of the organic peroxide, 1,1-di(tert-butylperoxy)cyclohexane is "260.38" and the bond number of the active oxygen thereof is two. Thus, the molar weight of the active oxygen of component (c-2) is "(0.1×0.4)/260.38×2≅0.0003". Therefore, E value of Example 3, being represented by "E=the molar amount of component (b)/the molar amount of the active oxygen of component (c), is "0.170/(0.00111+0.0003)≅120.6".

Preparing Method of Artificial Foreign Matter in Table 1

The durability to impact is evaluated under the circumstance that the core is easily cracked by mixing an artificial foreign matter in the rubber composition of each of Examples. The evaluation of the durability to impact is described later.

Regarding an artificial foreign matter, zinc oxide and fine powdered zinc stearate are mixed in weight ratio of 2:1 and the mixture thereof is heated in an oven at 150° C. for 30 minutes and then the temperature lower to room temperature, after that, the heated solid article is ground roughly. And this ground material is screened with 1 mm mesh and 0.5 mm mesh to obtain an aggregation having a diameter of 0.5 to 1.0 mm. Such the aggregation as an article foreign matter is added to a kneaded rubber of a rubber formulation shown in Table 1 with a roll in an amount (1 phr) of Table 1.

Cross-Sectional Hardnesses of Core

The cross-sectional hardnesses at various positions, including the surface and center, of the about 38.6 mm diameter core in each of the above Working Examples and Comparative Examples are measured by the following methods.

(1) Surface Hardness of Core

At a temperature of 23±1° C., the indenter of a durometer is perpendicularly set against a surface portion of the spherical core and the JIS-C hardness is measured at four random points on the core surface. The average value of these measurements is treated as the measured value for one core, and the average value for three measured cores is determined. These results are presented in Table 3.

(2) Cross-Sectional Hardnesses of Core

The core is cut through the center to obtain a flat cross-sectional plane. At a temperature of 23±1° C., the indenter of a durometer is perpendicularly set against the cross-sectional plane and the JIS-C hardness is measured at the center of the hemispherical core and at 2 mm intervals from the center toward the surface, thereby collecting the measurements for one core. The average values for three measured cores are determined. These results are presented in Table 3.

Core and Ball Deflection

The amount of deflection (mm) by each core and ball when compressed at a speed of 10 mm/s under a final load of 1,275 N (130 kgf) from an initial load of 98 N (10 kgf) is measured at a temperature of 23±1° C. In each case, the average value for 10 measured cores or balls is determined.

Formation of Cover (Intermediate Layer and Outermost Layer)

Using an injection mold, the intermediate layer material (ionomer resin material) shown in Table 2 is then injection-molded over the surface of the above core, thereby forming an intermediate layer having a thickness of 1.3 mm and a Shore D hardness of 64. Next, using a different injection mold, the outermost layer material (urethane resin material) shown in Table 2 is injection-molded over the intermediate layer-encased sphere, thereby forming an outermost layer having a thickness of 0.8 mm and a Shore D hardness of 40.

TABLE 2

| Formulation (pbw) | Intermediate layer | Outermost layer |
|---|---|---|
| Himilan 1706 | 35 | |
| Himilan 1557 | 15 | |
| Himilan 1605 | 50 | |
| TPU | | 100 |
| Polyethylene wax | | 1.0 |
| Isocyanate compound | | 6.3 |
| Titanium oxide | | 3.3 |
| Trimethylolpropane | 1.1 | |

Details on the compounding ingredients in the table are given below.

Himilan 1706, Himilan 1557, Himilan 1605: Ionomer resins available from Dow-Mitsui Polychemicals Co., Ltd.

TPU: An ether type-thermoplastic polyurethane available under the trade name "Pandex" from DIC Covestro Polymer, Ltd.; Shore D hardness, 40

Polyethylene wax: Available under the trade name "Sanwax 161P" from Sanyo Chemical Industries, Ltd.

Isocyanate compound: 4,4'-Diphenylmethane diisocyanate

The spin rates of the resulting golf balls on shots with a driver and the durability of the resulting golf balls to impact are evaluated by the following method. The results are shown in Table 3.

Spin Rate on Shots with a Driver

A driver (W #1) is mounted on a golf swing robot and the spin rate of the ball immediately after being struck at a head speed of 45 m/s is measured using an apparatus for measuring the initial conditions. The club used is the TourB XD-3 Driver (2016 model; loft angle, 9.5°) manufactured by Bridgestone Sports Co., Ltd. The spin rate is also shown in Table 3. In addition, the graph illustrating the relationships between the golf ball deformation and spin rate hitting with a driver (W #1) in each of Examples and Comparative Examples is shown in FIG. 1.

Durability to Impact

Figure 2:
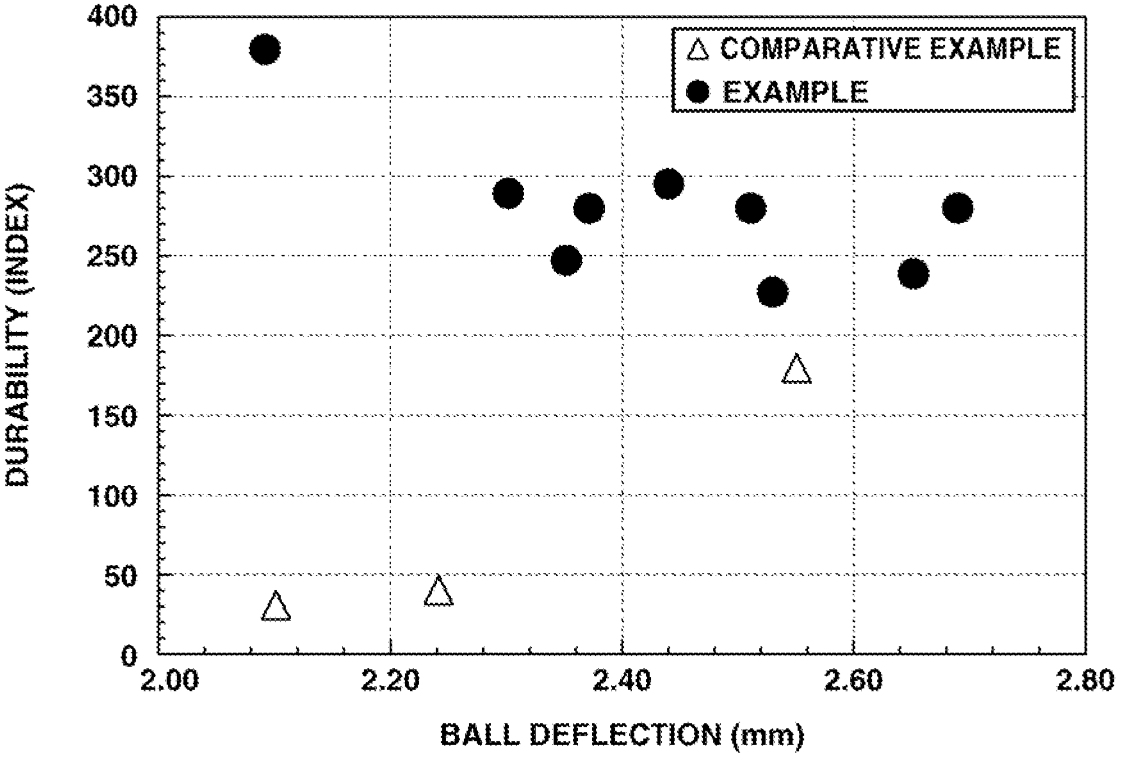
FIG. 2 is a graph for illustrating the relationships between the golf ball deflection and the durability to impact in each of Examples and Comparative Examples.

The durability of the golf ball is evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates is set to 43 m/s. The number of shots required for the golf ball to crack is measured, and the average value of the measurements taken for ten golf balls is calculated. Durability values for the balls in the respective Examples are calculated relative to an arbitrary index of 100 for the average number of shots required for the ball obtained in Comparative Example 1 to crack. In addition, the graph illustrating the relationships between the golf ball deformation and the durability to impact in each of Examples and Comparative Examples is shown in FIG. 2.

TABLE 3

| | | Working Example | | | | | | | | | Comparative Example | | |
|---|---|---|---|---|---|---|---|---|---|---|---|---|---|
| | | 1 | 2 | 3 | 4 | 5 | 6 | 7 | 8 | 9 | 1 | 2 | 3 |
| Core (After abrading) | Diameter (mm) | 38.64 | 38.64 | 38.63 | 38.64 | 38.64 | 38.62 | 38.69 | 38.63 | 38.66 | 38.66 | 38.64 | 38.64 |
| | Weight (g) | 34.85 | 34.78 | 34.80 | 34.75 | 34.79 | 34.71 | 34.66 | 34.58 | 34.62 | 34.97 | 34.89 | 34.88 |
| | Deflection (mm) | 2.88 | 3.10 | 3.11 | 2.90 | 2.83 | 3.22 | 3.31 | 3.29 | 2.49 | 3.26 | 2.82 | 2.55 |
| Core hardness profile (JIS-C) | Center hardness (B) | 66.0 | 64.0 | 65.7 | 67.5 | 67.6 | 57.9 | 61.7 | 62.8 | 67.2 | 65.0 | 70.1 | 72.2 |
| | Hardness 2 mm from center | 67.3 | 66.2 | 66.8 | 68.5 | 68.3 | 61.8 | 62.7 | 63.4 | 68.0 | 66.4 | 71.2 | 73.0 |
| | Hardness 4 mm from center | 69.1 | 68.2 | 67.1 | 69.8 | 69.4 | 64.7 | 63.2 | 64.2 | 69.3 | 67.2 | 72.0 | 73.8 |
| | Hardness 6 mm from center | 71.0 | 69.2 | 68.3 | 70.9 | 70.2 | 66.7 | 64.0 | 65.3 | 70.3 | 68.8 | 72.6 | 74.5 |
| | Hardness 8 mm from center | 72.0 | 69.2 | 68.8 | 71.6 | 70.4 | 67.6 | 64.6 | 66.2 | 70.7 | 69.8 | 72.5 | 74.6 |
| | Hardness 10 mm from center | 72.1 | 69.3 | 68.7 | 71.7 | 70.6 | 67.8 | 65.5 | 67.2 | 71.3 | 70.2 | 72.7 | 74.1 |
| | Hardness 12 mm from center | 72.2 | 71.0 | 70.5 | 72.4 | 71.1 | 69.5 | 71.1 | 70.9 | 73.5 | 71.1 | 73.1 | 74.0 |
| | Hardness 14 mm from center | 77.2 | 75.8 | 77.8 | 76.9 | 74.2 | 77.3 | 75.8 | 77.8 | 82.0 | 72.7 | 75.9 | 76.1 |
| | Hardness 16 mm from center | 83.5 | 84.5 | 81.8 | 83.4 | 85.1 | 81.4 | 76.9 | 79.4 | 84.5 | 83.4 | 86.0 | 87.6 |
| | Hardness 18 mm from center | 85.7 | 87.2 | 83.2 | 84.9 | 87.4 | 82.2 | 77.5 | 80.3 | 85.7 | 85.7 | 89.2 | 91.1 |
| | Surface hardness (A) | 86.0 | 89.1 | 84.4 | 85.7 | 88.9 | 83.2 | 78.4 | 81.1 | 86.8 | 87.1 | 90.0 | 92.3 |
| | Hardness difference (A-B) | 20.0 | 25.1 | 18.7 | 18.2 | 21.3 | 25.3 | 16.7 | 18.3 | 19.6 | 22.1 | 19.9 | 20.1 |
| Intermediate layer | Diameter (mm) | 41.01 | 41.03 | 41.03 | 41.03 | 41.02 | 41.03 | 41.03 | 41.00 | 41.05 | 41.02 | 41.03 | 41.04 |
| Ball | Diameter (mm) | 42.70 | 42.69 | 42.69 | 42.70 | 42.68 | 42.69 | 42.70 | 42.68 | 42.69 | 42.70 | 42.69 | 42.70 |
| | Weight (g) | 45.43 | 45.37 | 45.38 | 45.31 | 45.36 | 45.29 | 45.24 | 45.16 | 45.16 | 45.51 | 45.49 | 45.50 |
| | Deflection (mm) | 2.35 | 2.51 | 2.44 | 2.37 | 2.30 | 2.53 | 2.69 | 2.65 | 2.09 | 2.55 | 2.24 | 2.10 |
| Evaluation | Spin rate on driver shots (rpm) | 3,031 | 2,929 | 3,005 | 3,041 | 3,051 | 2,918 | 2,891 | 2,899 | 3,131 | 2,942 | 3,108 | 3,142 |
| | Durability (Index) | 138 | 156 | 164 | 156 | 161 | 127 | 156 | 133 | 211 | 100 | 22 | 17 |

As shown in Table 3, in each of Working Examples 1 to 9, it is seen that the hardness difference in the core interia is larger, the spin rate of the golf ball on shots with a driver is reduced and the durability of the ball to impact is excellent.

On the other hand, as shown in FIG. 2, in each of Comparative Examples 1-3, it is seen that the durability of the ball to impact is sufficient lower on the same amount of the deflection when each of the Comparative Examples is compared to each of Working Examples 1 to 9. In particular, when the deflection is smaller (i.e. harder core hardness), the improved effect of durability to impact in the Example is larger.

The invention claimed is:

1. A golf ball comprising a core and a cover of one or more layers encasing the core, wherein the core is formed of the rubber composition, comprising:

(a) a base rubber, (b) zinc diacrylate (ZDA) as a co-crosslinking agent, (c) a crosslinking initiator, and (d) an alcohol, wherein the amount of component (d) is from 0.1 to 10 parts by weight per 100 parts by weight of the base rubber (a) and the compounding ratio between component (b) and component (c) is set to at least 60 of E value that is represented by "E=the molar amount of component (b)/the molar amount of the active oxygen of component (c)", the core includes grafted polymers of BR-ZDA in which ZDA nanoparticles agglomerate to become secondary particles and further the secondary particles are connected mutually such that a network structure is formed, and the core has a hardness profile in which a surface and a center of the core have a hardness difference therebetween of at least 16 on the JIS-C hardness scale.

2. The golf ball of claim 1, wherein the core has an amount of deflection of not more than 3.2 mm when compressed under a final load of 1,275 N (130 kgf) from an initial load of 98 N (10 kgf).

3. The golf ball of claim 1, wherein component (d) is a lower alcohol having a molecular weight of less than 200.

4. The golf ball of claim 1, wherein component (d) is butanol, glycerol, ethylene glycol, diethylene glycol, triethylene glycol, propylene glycol, dipropylene glycol, or tripropylene glycol.

5. The golf ball of claim 1, wherein component (d) has a value obtained by dividing the molecular weight by the number of hydroxyl groups (valence) that is 100 or less.

6. The golf ball of claim 1, wherein the amount of component (d) is from 0.1 to 5 parts by weight per 100 parts by weight of the base rubber (a).

7. The golf ball of claim 1, wherein the E value is at least 70.

8. The golf ball of claim 1, wherein component (a) is polybutadiene synthesized with a rare-earth catalyst.

9. The golf ball of claim 1, further comprising sulfur or an organosulfur compound serving as component (e).

10. The golf ball of claim 1, wherein the component (e) is the organosulfur compound selected among thiols and alkylphenoldisulfide polymers.

11. The golf ball of claim 1, wherein, further as component (f), hinderedphenol or benzoimidazole of the following general formula (1) and/or a metal salt is included (1)

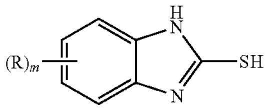

wherein in formula (1), R is a hydrogen atom or a hydrocarbon group of 1 to 20 carbon atoms and m is an integer from 1 to 4, with each R being the same or different when m is 2 or more.

12. The golf ball of claim 1, wherein the amount of component (b) is from 38.5 to 60 parts by weight per 100 parts by weight of the base rubber (a).

13. The golf ball of claim 1, wherein the amount of component (c) is from 0.05 to 0.80 part by weight per 100 parts by weight of the base rubber (a).

14. The golf ball of claim 1, wherein component (d) is glycerol.

15. The golf ball of claim 10, wherein the component (e) is the alkylphenoldisulfide polymers.

16. The golf ball of claim 15, wherein the alkylphenoldisulfide polymers are amylphenoldisulfide polymers.

* * * * *